Nov. 1, 1932.                B. C. TRAVIS                1,886,316
                              JUNCTION BOX
                            Filed Nov. 9, 1927
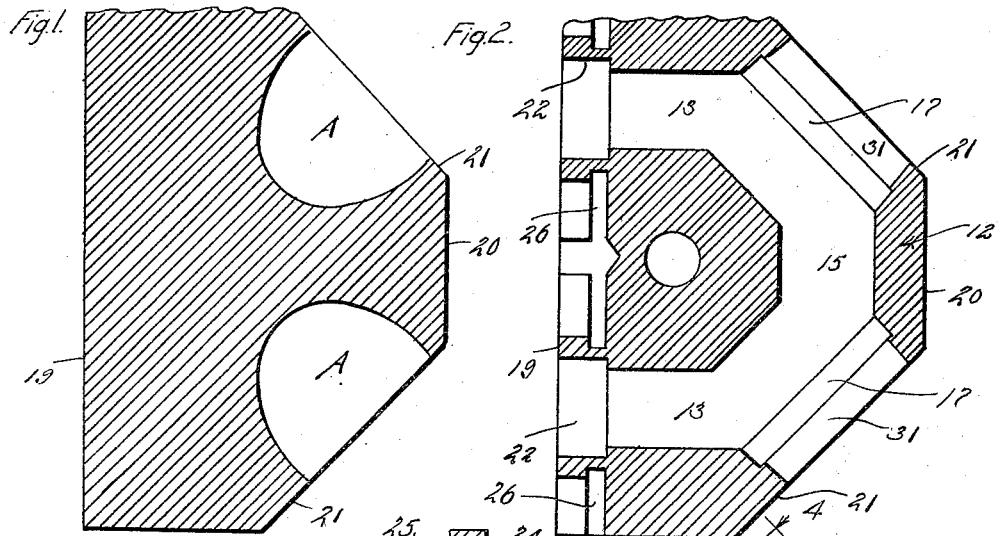
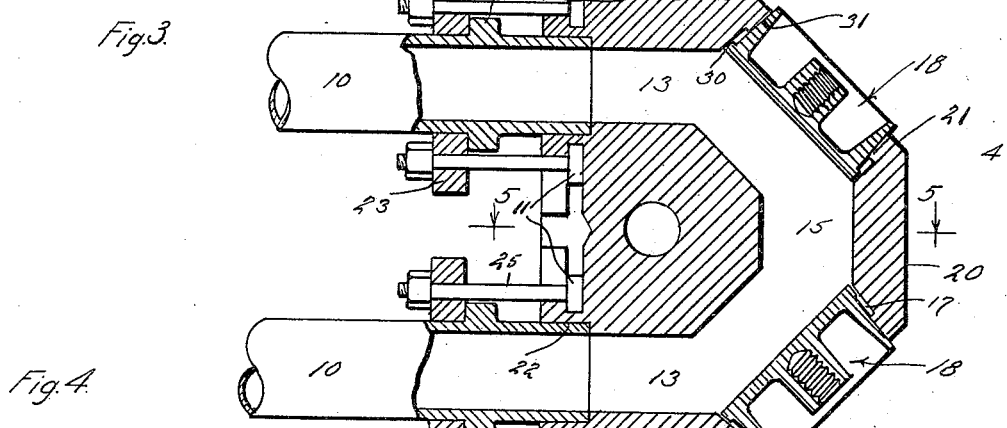
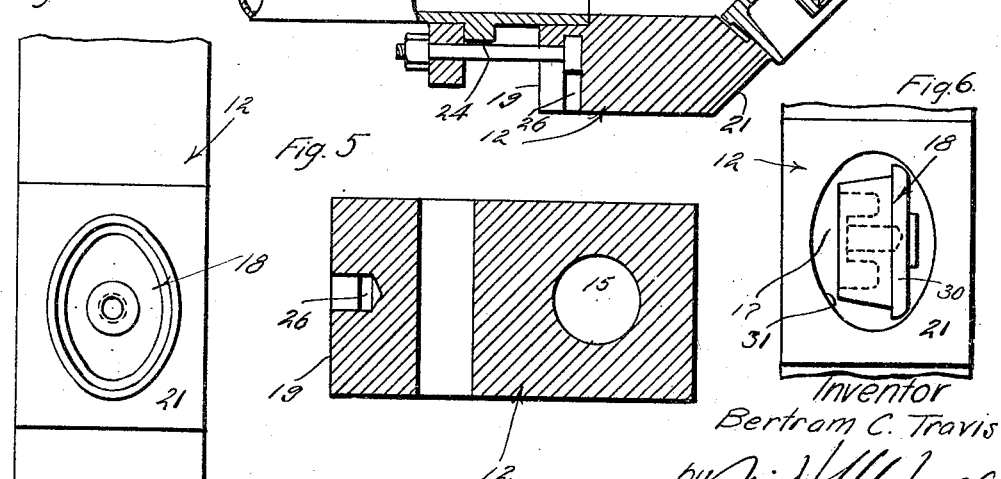
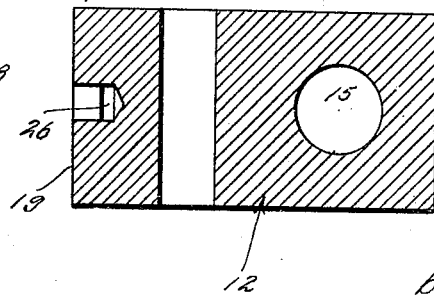
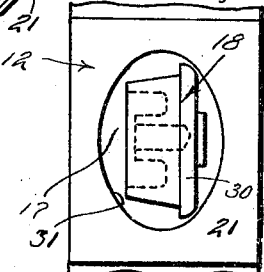
Inventor
Bertram C. Travis
by
his Attorney Patented Nov. 1, 1932

1,886,316

UNITED STATES PATENT OFFICE

BERTRAM C. TRAVIS, OF LOS ANGELES, CALIFORNIA, ASSIGNOR OF ONE-HALF TO PACIFIC COPPER AND BRASS WORKS, INCORPORATED, OF LOS ANGELES, CALIFORNIA, A CORPORATION OF CALIFORNIA

JUNCTION BOX

Application filed November 9, 1927. Serial No. 232,080.

This invention has to do with a junction box suitable for receiving tubes, or the like, and it is an object of the invention to provide a junction box that can be used to advantage in boilers, stills, and in other situations where fluids are handled at high pressures or temperatures.

There are numerous situations in which flues or tubes are arranged in banks and have their ends joined through devices known as return bends or junction boxes. These junction boxes serve to hold the ends of the tubes and to conduct fluid between the tubes. I will, for purpose of example, refer to oil stills as they present a typical construction of this character. It is, generally, necessary that a junction box be constructed to withstand high pressures, and it is desirable to provide them with openings opposite the tubes for the insertion of tubing rollers, cleaners, etc. In practice, forged junction boxes have possessed certain advantages incidental to the dependability and general superiority of a forging over a casting, but have been expensive and have had plugged openings that have given more or less trouble. The cast junction boxes that have been used have been large, cumbersome devices and, like the forged devices, have had heavy, inconvenient exterior closure devices for the purpose of closing the service openings opposite the tubes. The closure means used in these devices have been in the nature of caps held in place through strong-backs or screws, and have given rise to considerable trouble.

It is a primary object of this invention to provide a junction box of the general type hereinabove referred to which may be in the nature of a forging and in which the necessary ports and openings are formed by providing only the necessary service openings in addition to the tube carrying openings.

It is another object of this invention to provide a junction box which is simple and compact and, therefore, occupies but very little space.

It is a further object of my invention to provide a junction box in which the service holes are effectively and reliably closed without the provision of parts on the exterior of the box.

It is a further object of my invention to provide a junction box having a forged body and having a fluid passage which will pass fluid between tubes with a minimum of friction.

The various objects and features of my invention will be best and more fully understood from the following detailed description of a typical form and application of the invention, throughout which description reference is had to the accompanying drawing, in which:

Fig. 1 is a sectional view of a forged blank from which the body of my junction box may be formed;

Fig. 2 is a sectional view of the finished body of the junction box;

Fig. 3 is a sectional view of the junction box provided by my invention showing two tubes connected into it, and showing the service holes in the body closed;

Fig. 4 is an exterior view taken as indicated by line 4—4 on Fig. 3;

Fig. 5 is a sectional view, taken as indicated by line 5—5 on Fig. 3; and

Fig. 6 is a view illustrating the manner in which my improved plug closure can be passed into and out of operating position.

The present invention is particularly suited for use in joining or forming a return connection between two parallel tubes and, therefore, I have chosen to set forth in this application a simple form of the invention in which the junction box operates to join or form a return connection between two parallel tubes 10 spaced one above the other. In this case, the junction box is arranged in an upright or vertical position and its parts will be described in such position, it being understood that the invention contemplates arranging or disposing the junction box in any desired position, for instance, at an angle or horizontally as circumstances may require.

The junction box provided by my invention includes, generally, a body 12 having spaced tube openings 13, a transverse connecting port 15, service openings 17, and closures 18 for the service openings.

The body 12 of the junction box is preferably a block of steel, or the like, it being preferred to make it a forging. It is to be understood, however, that the block may be a casting. The body presents a flat, inner end 19, an outer end 20, and beveled outer corners 21. The general configuration of the body will be apparent from consideration of Figs. 1, 4 and 5 of the drawing. When making the body a forging, it is preferred to form it as shown in Fig. 1 so that it has comparatively large, deep openings A forged in it from or at the beveled off corners 21. The general construction or configuration of the body is such that it can be very easily and quickly forged into the desired shape with the openings A provided in its beveled outer corners. The openings A form roughly the service openings of the box which are later finished as will be hereinafter described.

The tubes 10 connect into the inner side or end of the body 12. The tube openings 13, provided in the body 12 to receive the tubes 10, extend into the body from its inner end 19. The mouths or tube receiving portions 22 of the openings 13 are enlarged to receive the ends of the tubes in the manner clearly illustrated in Fig. 3 of the drawing. The tubes may be made tight in the portions 22 of the tube holes by rolling or in any suitable manner. The tubes may be tied or connected to the body of the junction box by suitable clamps 23 engaged over flanges 24 fixed on the tubes, and screws 25 engaging the clamps and having their heads 11 held in slot-like sockets 26 provided in the end 19 of the body. In the form of the invention illustrated in the drawing, the main portions of the tube holes 13 correspond in size to the inside diameter of the tubes 10 so that the flow of fluid is not in any way influenced by passage between the tubes and the tube holes.

The connecting port 15 formed transversely in the body 12 conducts the fluid in its passage between the tube holes 13. In the case of a junction box connecting tubes 10 spaced one above the other, the connecting port 15 extends vertically, as shown throughout the drawing. The port 15 is preferably located at the outer end portion of the body 12. In the design illustrated in the drawing, the service holes are formed diagonally in the body, that is, from the beveled corners 21. The service holes connect the tube holes and the port 15 and form openings in the outer portion of the body through which the tube holes can be reached. It is desirable to make the port 15 somewhat larger in diameter than the tube holes 13 and to make the capacity of the port 15 correspond to, or approach more or less, the capacity of the portions of the service openings which connect the tube holes and port 15.

In accordance with my invention, opposite corners of the body at the outer end thereof are beveled, as shown at 21, so that each beveled corner or face 21 is intersected by the axis of the connecting port 15 and by the axis of one of the tube holes 13. In the case illustrated in the drawing, the outer end of the body 12 has its upper and lower corners beveled off a considerable amount so that the beveled corner faces 21 are of considerable extent and are intersected by the axes of the tube holes and connecting port.

The service holes 17 are formed in the body 12 from the beveled or inclined corner faces 21 so that they intersect the port 15 and tube holes. In the particular design shown in the drawing, the service holes establish communication between the tube holes and the port 15. Each service hole is made comparatively large and is located in the corner face 21 so that a tool or device of any kind corresponding in size to the interior of the tube hole can be passed through the service hole into the tube hole along the axis of the tube hole. This arrangement, which is clearly illustrated in Figs. 2 and 3 of the drawing, allows for free passage of tubing rollers, cleaners, etc., into and out of the tubes or tube holes through the service holes. Further, the service holes are located with reference to the port 15 so that a suitable milling or boring tool can be passed through one of the service holes for the purpose of boring or machining the port 15 transversely in the body between the inner portions of the service holes.

Any suitable means may be used to close the outer portions of the service holes; for instance, I may use caps held by screws or clamps in the manner common to devices of this character.

In accordance with my invention, I close the outer parts or mouths of the service holes by means of plug closures 18. The plug closures 18, shown in the drawing, are of the general type set forth and claimed in my copending application entitled "Boiler plug", filed August 29th, 1927, Serial No. 216,084. This plug is of tapered elliptical formation and is provided at its large or inner end with a projecting safety lug 30. In using this type of closure plug 18, the service hole, or at least the mouth portion of the service hole, is finished so that it has an outwardly convergent elliptical seat 31 to receive the plug. This seat 31 may be machined or formed by the device set forth and claimed in my copending application entitled "Boring tool", filed April 6th, 1927, Serial No. 181,374. The length of the plug and seat and the difference between the major and minor axes of the plug and seat are related or proportioned so that the plug can be passed edge-wise through the seat into the inner part of the service hole where it can be turned and drawn outwardly into the seat to fit the seat, as shown in Fig. 3 of the drawing. In Fig. 6 of the drawing, I show the plug positioned with reference to the seat opening 31 to be passed through the seat. With this arrangement and formation of parts, the plug closure 18 can be inserted in the seat 31 of the service hole so that pressure coming upon the plug from the interior of the box simply forces the plug tightly into the seat, making the joint between the plug and seat tight. This manner of closing the service openings is very desirable as it entirely eliminates the use of ground joints or washers and the cumbersome expensive clamping arrangements that have heretofore been used in devices of this character. In the preferred formation or arrangement of parts, the major axis of the elliptical seat 13 at the mouth of the service opening is made to correspond to, or be parallel with, the major axis of the ellipse resulting from the projection of the tube hole on to the beveled face 21. This arrangement of parts is shown in Fig. 4 of the drawing.

In using the junction box provided by my invention, the tubes 10 are made secure in the tube holes 13 in any suitable manner and, if necessary, by the insertion of suitable tools or devices through the service holes. The service holes are then closed by insertion of the plug closures 18 into the junction box so that they seat in the seats 31 in the mouths of the service holes. The device is then ready to receive pressure and as pressure comes upon the plug closures, they are held tight in the seats 31. Fluid is readily passed through the junction box between the tubes as the passage between the tube openings 13, formed by the service holes and port 15, is of greater capacity than the tubes or tube holes, and is of such formation that it causes a gradual reversal in direction of flow and thus offers little resistance to flow. Whenever it is necessary to clean out the junction box or tubes, or to make repairs upon the tubes, the pressure is relieved from the apparatus, whereupon the plug closures can be dislodged from the seats 31 and removed from the body, making all parts accessible.

Particular attention is called to the fact that my invention provides a forged junction box in which the fluid passages within the body can be machined or formed so that the body has only two service holes in addition to the tube receiving holes. Further, I wish to call particular attention to the simple, compact structure resulting from my invention and to the total absence of projecting lugs and other parts heretofore found in devices of this character.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A junction box including a body with beveled surface at its forward end corners and having spaced tube openings extending into it from its rear end, a transverse connecting opening connecting the tube openings, and service openings in the beveled corners, each having its axis normal to a beveled surface, the service openings forming direct straight openings from the tube openings and the connecting opening to the exterior of the body.

2. A junction box including a body having tube openings extending into it from one end, a connecting opening between the tube openings, and a service opening extending into the body from one corner and communicating with the other openings in the body, the service opening being elliptical in cross sectional configuration and being disposed so that its major axis intersects the axes of the connecting opening and one of the tube openings.

3. A junction box including a body having a bevelled corner at its forward end, the body having tube openings extending into it from its rear end, a transverse connecting opening between the tube openings and a service opening extending into it from the bevelled corner, the service opening being elliptical in cross sectional configuration and being disposed so that its major axis intersects the axes of the connecting opening and one of the tube openings.

4. A junction box including a body having spaced tube openings extending into it from one end, a transverse connecting opening between the tube openings, and a service opening in the other end of the body communicating with one tube opening and the connecting opening and registering with the said tube opening to form a passage directly to the exterior of the body from said tube opening and registering with the connecting opening to form a straight passage directly to the exterior of the body from the connecting opening.

In witness that I claim the foregoing I have hereunto subscribed my name this 15th day of October 1927.

BERTRAM C. TRAVIS.